United States Patent [19]

Wisniewski et al.

[11] Patent Number: 5,687,176
[45] Date of Patent: Nov. 11, 1997

[54] ZERO BYTE SUBSTITUTION METHOD AND APPARATUS FOR TELECOMMUNICATIONS EQUIPMENT

[75] Inventors: James J. Wisniewski, Bristow; Fred E. Glave, Great Falls, both of Va.; Craig A. Sharper, Los Altos, Calif.

[73] Assignees: Hubbell Incorporated, Orange, Conn.; Telesend, Inc., Los Altos, Calif.

[21] Appl. No.: 489,400

[22] Filed: Jun. 12, 1995

Related U.S. Application Data

[63] Continuation-in-part of Ser. No. 489,294, Jun. 9, 1995, abandoned.

[51] Int. Cl.$^6$ .................... H04J 3/06; H04J 3/12
[52] U.S. Cl. .................. 370/476; 370/503; 370/524; 375/357
[58] Field of Search .................. 370/99, 110.1, 370/476, 503, 522, 524; 375/357

[56] References Cited

U.S. PATENT DOCUMENTS

| Re. 28,577 | 10/1975 | Schmidt | 179/15 |
|---|---|---|---|
| 3,405,235 | 10/1968 | Carter | 178/69 |
| 3,502,810 | 3/1970 | Aaron et al. | 178/68 |
| 3,569,934 | 3/1971 | Parr, Jr. | 340/146.1 |
| 3,603,739 | 9/1971 | Edson | 179/15 |
| 3,626,369 | 12/1971 | Ainsworth | 340/163 |
| 3,688,039 | 8/1972 | Ishiguro | 178/88 |
| 3,805,254 | 4/1974 | Schuur | 340/172.5 |
| 3,873,977 | 3/1975 | McIntosh | 340/347 |
| 4,032,886 | 6/1977 | En et al. | 340/146.1 |

(List continued on next page.)

FOREIGN PATENT DOCUMENTS

| 55-118118 | 9/1980 | Japan | G06F 3/00 |
|---|---|---|---|
| 5647144 | 4/1981 | Japan | H04L 1/10 |
| 56-47150 | 4/1981 | Japan | H04L 13/00 |
| 6193749 | 5/1986 | Japan | H04L 7/02 |
| 62-98922 | 5/1987 | Japan | H03M 7/46 |
| 63-126324 | 5/1988 | Japan | H03M 5/16 |
| 2218224 | 8/1990 | Japan | H03M 7/30 |
| 411430 | 1/1992 | Japan | H04L 25/49 |
| 4150338 | 5/1992 | Japan | H04L 7/33 |

OTHER PUBLICATIONS

"Digital Channel Banks—Requirements for Dataport Channel Unit Functions", Bell Communications Technical Advisory TA–TSY–00077, Issue 2, Aug. 1985 (27 pages).

"AHG28, S1:2 Brite II Channel Unit—Data Sheet—D4 Channel Bank", AT&T Data Sheet 365–005–103, Issue 4, Dec. 1991 (pp. 1–9).

"SLC® Series 5 Carrier System—AUA92 ISDN Brite II Channel Unit—5SC1JEO", AT&T Data Sheet 363–005–130, Issue 1, Jun. 1991 (pp. 1–5).

"SLC® Series 5 Carrier System—AUA93 ISDN Brite II Channel Unit—5SC1HEO", AT&T Data Sheet 363–005–131, Issue 2, Oct. 1990 (pp. 1–5) (Advance Printing).

(List continued on next page.)

*Primary Examiner*—Russell W. Blum
*Attorney, Agent, or Firm*—Jerry M. Presson; John E. Holmes

[57] ABSTRACT

An interface circuit is provided for implementing zero-byte substitution (ZBS) in a channel unit or line card which couples a digital subscriber line, such as a basic or primary rate Integrated Services Digital Network (ISDN) line, to a T1 network or other digital transmission facility. On the transmit side, the occurrence of an all-zero data byte in a B channel of the ISDN interface causes a corresponding zero byte indicator (ZBI) flag to be produced in the D+ channel, and also causes the all-zero byte to be replaced by the preceding non-zero data byte rather than by a prescribed or predetermined data byte. On the receive side, the occurrence of a repeated data byte in a B channel is detected and causes the current data byte to be replaced by an all-zero byte to restore the original data. The ZBI flag is then used as an error check bit to verify that the reinsertion of the all-zero byte was correct.

33 Claims, 10 Drawing Sheets

U.S. PATENT DOCUMENTS

| | | | |
|---|---|---|---|
| 4,059,731 | 11/1977 | Green et al. | 179/15 |
| 4,305,063 | 12/1981 | Hanson | 340/347 |
| 4,309,694 | 1/1982 | Henry | 340/347 |
| 4,327,379 | 4/1982 | Kadakia et al. | 358/261 |
| 4,394,759 | 7/1983 | Donne | 370/110.1 |
| 4,494,151 | 1/1985 | Liao | 358/261 |
| 4,502,143 | 2/1985 | Kato et al. | 371/57 |
| 4,509,164 | 4/1985 | Mouftah | 370/29 |
| 4,512,026 | 4/1985 | Vander Meiden | 375/114 |
| 4,587,514 | 5/1986 | Schas et al. | 340/347 |
| 4,644,546 | 2/1987 | Doi et al. | 371/49 |
| 4,684,923 | 8/1987 | Koga | 340/347 |
| 4,741,531 | 5/1988 | Blondeau, Jr. et al. | 375/25 |
| 4,747,098 | 5/1988 | Huang et al. | 370/99 |
| 4,747,112 | 5/1988 | Blondeau, Jr. et al. | 375/20 |
| 4,750,179 | 6/1988 | Davidow et al. | 371/57 |
| 4,752,765 | 6/1988 | Larson | 340/347 |
| 4,757,499 | 7/1988 | Gorshe | 370/99 |
| 4,757,500 | 7/1988 | Gorshe | 370/99 |
| 4,757,501 | 7/1988 | Gorshe | 370/99 |
| 4,799,217 | 1/1989 | Fang | 370/68.1 |
| 4,802,221 | 1/1989 | Jibbe | 381/34 |
| 4,853,931 | 8/1989 | Gorshe | 371/55 |
| 4,868,831 | 9/1989 | Gorshe | 371/57.2 |
| 5,020,058 | 5/1991 | Holden et al. | 370/109 |
| 5,051,988 | 9/1991 | Kawahigashi et al. | 370/99 |
| 5,057,837 | 10/1991 | Colwell et al. | 341/55 |

OTHER PUBLICATIONS

D. Frankel, "ISDN Reaches the Market", *IEEE Spectrum*, Jun. 1995, pp. 20–25.

G. Pettersson, "ISDN: From Custom to Commodity Service", *IEEE Spectrum*, Jun. 1995, pp. 26–31.

J.H. Green, *The Dow Jones-Irwin Handbook of Telecommunications* (Homewood, Illinois: Dow Jones—Irwin, 1986), pp. 648–651.

"ISDN Basic Access Transport System Requirements—Interfaces for Multiplexing Basic Access on DS1 & Higher Rate Facilities", Bellcore TR–NWT–000397, Issue 3, Dec. 1993, pp. 10–1 through 10–24.

W. Buckley, "VCC Signal Processing Method of Zero Code Substitution", ESCA ECSA T1X1.4/85–f (64CCC SWG), Mar. 1985.

S. Gorshe et al, "A Robust Technique for Providing Clear Channel Capability Over Existing and Future Digital Transmission Facilities", Proceedings of IEEE International Conference on Communications (87CH2424–0), Jun. 1987.

S. Gorshe, "A New Zero Suppression Scheme Requiring Only 3kb/s of the Extended Frame Format Data Channel for Overhead", ECSA T1X1.4/85–a (64CCC SWG), Mar. 1985.

G. Beveridge et al, "Line Code Formats for ISDN Clear Channels: Stand–Alone vs. Integrated Network Solutions", ECSA T1X1.4/85–cb, Jul. 1985.

R. Bobilin, "62 kb/s Clear Channel Capability Without BPV Line Codes", ECSA T1X1.4/85–008, –008A, –008B and –008C, Feb. 1985.

S. Gorshe "Error Multiplication Associated With the A8ZS and B8ZS Zero Suppression Schemes", ECSA T1X1.4/85–b (64CCC SWG), Mar. 1985.

ZERO BYTE SUBSTITUTION METHOD AND APPARATUS FOR TELECOMMUNICATIONS EQUIPMENT

REFERENCE TO RELATED APPLICATION

This application is a continuation-in-part of a prior application filed by James J. Wisniewski et al on Jun. 9, 1995, Ser. No. 08/489,294 entitled "Zero Byte Substitution Method and Apparatus for Telecommunications Equipment", now abandoned which application is incorporated herein by reference.

FIELD OF THE INVENTION

The present invention relates generally to an interface circuit for telecommunications equipment. More specifically, the invention relates to an interface circuit for implementing zero byte substitution (ZBS) in a channel unit or line card which couples a digital subscriber line, such as a basic or primary rate Integrated Services Digital Network (ISDN) line, to a T1 network or other digital transmission facility.

BACKGROUND OF THE INVENTION

The Integrated Services Digital Network (ISDN) was developed to extend the benefits of the existing digital (T1) telephone network directly to the premises of the customer or subscriber. Currently, there are two types of ISDN subscriber interfaces, both employing the same basic signaling protocol. The basic rate interface (BRI) is a two-wire connection employing a data rate of 144 kilobytes per second, divided among two 8-bit bearer (B) channels having data rates of 64 kilobytes per second and a 2-bit delta (D) or control channel having a data rate of 16 kilobytes per second. Voice, data or video information, or a combination thereof, can be sent and received by the subscriber in digital form over the BRI. When voice information is involved, the same digital speech encoding and decoding process is used as in the existing T1 network, except that it takes place in the customer premises equipment (CPE) rather than in at a central office terminal (COT) or remote digital terminal (RDT). The primary rate interface (PRI) is similar to the BRI, but carries a greater number of B channels (typically 23 or 30) and uses an 8-bit D channel with a data rate of 64 kilobytes per second. The basic rate interface is typically used in residential subscriber installations, while the primary rate interface is designed for commercial applications requiring higher data bandwidth. In addition to the relatively high data rates that are possible with both types of ISDN interfaces, the availability of a separate D channel for signaling information allows control signals to be sent and received by the subscriber without interrupting the flow of data on the B channels, something which is not possible with existing analog subscriber interfaces.

The basic unit of B-channel data transmission in both T1 and ISDN is a byte or time slot consisting of eight digital bits, with each bit having either a high or low logic level (i.e., 1 or 0). In order to avoid signal amplitude drift in the repeaters (amplifiers) used in the T1 network, each byte or time slot must contain a logical 1 in at least one of the eight bit positions. This requirement, sometimes referred to as the ones-density requirement, is ordinarily not a problem in the case of voice information, since a logical 1 can be inserted into one of the least significant bit positions of the time slot without any noticeable effect on voice quality. However, video and computer data of the type that typically passes through an ISDN interface frequently includes all-zero bytes, and the integrity of this data must be preserved.

In order to address this problem, a scheme has been developed in which all-zero bytes occurring on either of the B channels of an ISDN basic rate interface are detected and replaced with a prescribed bit pattern that has a logical 1 in at least one bit position. In this technique, which is described in U.S. Pat. No. 4,799,217 to Fang, incorporated herein by reference, an extended D channel (referred to as a D+ channel) having 8 rather than 2 bit positions is also provided. The two B channels and the D+ channel are combined into a three-time-slot format for transmission over a digital transmission facility. Of the additional 6 bit positions in the D+ channel, two (referred to as zero-byte indicator, or ZBI, bit positions) are provided to serve as flags for indicating whether a zero-byte substitution has been made in either of the B channels. The ZBI bits are inserted by the ISDN interface at the transmit end, and are interrogated at the receive end to determine whether the corresponding B-channel data bytes should be replaced with all-zero bytes. In this way, the integrity of the original data is preserved without violating the ones-density requirement of the T1 communication network. The 8-bit D+ channel is converted back to a standard BRI 2-bit D channel before being passed to the subscriber, and hence the zero-byte substitution process is transparent insofar as the subscriber equipment is concerned.

Although the zero-byte substitution implementation described above operates satisfactorily in most instances, its accuracy is dependent upon the ZBI flags being properly set and not being lost during the transmission process. If a ZBI flag is lost (i.e., changes from 0 to 1 or vice-versa) as a result of signal interference or equipment failure, there is no indication at the receiving end that an all-zero byte should be reinserted in the corresponding B channel in place of the prescribed replacement bit pattern. In recognition of this problem, it has been the practice to replace all-zero bytes at the transmit end with a prescribed bit pattern (such as 0000 0001 or 0000 0010) which is numerically close to zero. In this way, loss of the ZBI flag will result in data being sent to the subscriber which, although erroneous, is at least numerically close to the original data. Although this is a reasonably satisfactory solution, it would be preferable to devise a zero-byte substitution scheme whose reliability does not depend entirely on the presence or absence of the ZBI flags.

SUMMARY OF THE INVENTION

A primary object of the present invention is to provide a zero-byte substitution implementation for an ISDN interface or the like, which does not rely solely on the presence or absence of a ZBI flag in determining whether or not to replace a received data byte with an all-zero data byte.

A further object of the invention is to provide a zero-byte substitution implementation in which the ZBI flag is used only as an error checking mechanism after a received data byte has already been replaced with an all-zero data byte, rather than in controlling such replacement in the first instance.

A further object of the invention is to provide a zero-byte substitution implementation which does not require the use of a prescribed bit pattern to replace an all-zero byte at the transmit end, but which is nevertheless fully compatible with systems that do rely on the use of such a prescribed bit pattern.

A still further object of the present invention is to provide a zero-byte substitution implementation which is relatively simple in construction and operation, and which can be incorporated into existing types of ISDN channel units or line cards without requiring major design modifications.

Still another object of the present invention is to provide a zero-byte substitution implementation which is transparent to the subscriber or customer and which is fully compatible with the existing T1 telecommunications network.

The foregoing objects are substantially achieved by providing a novel interface circuit which couples a digital subscriber line, particularly an ISDN line, to a T1 network or other digital transmission facility. On the transmit side, the occurrence of an all-zero data byte in a B channel not only causes a corresponding ZBI flag to be produced in the D+ channel, but also causes the all-zero byte to be replaced by the preceding non-zero data byte rather than by a prescribed or predetermined data byte. On the receive side, the occurrence of a repeated data byte in a B channel is detected and causes the current data byte to be replaced by an all-zero byte to restore the original data. The ZBI flag is then used as an error check bit to verify that the re-insertion of the all-zero byte was correct; if so, no further action is needed. However, if the state of the ZBI flag indicates that an error was made, the original data is restored.

In a preferred embodiment of the invention, the receive end equipment checks not only for a repeated data byte, but also for a data byte which matches a prescribed bit pattern that may have been used to replace an all-zero byte at the transmit end by equipment that operates in accordance with the known technique described previously. This allow compatibility between the two zero-byte substitution schemes, so that ISDN channel units or line cards produced by different vendors can communicate with each other. The receive end equipment can also be adapted to continuously monitor any prescribed bit pattern that may be in use at the transmit end, in case the prescribed replacement bit pattern is changed. This is done by checking for instances in which the received ZBI flag indicates that a zero-byte substitution has been made, but the current data byte does not match the prescribed bit pattern stored at the receiving end. When this occurs, the prescribed bit pattern stored at the receive end is replaced with a new value equal to the current data byte.

In accordance with one aspect of the present invention, an interface circuit for coupling a digital subscriber line to a digital transmission facility comprises a first latch having an input and output, for receiving and storing a current data byte from the digital subscriber line, and a second latch also having an input and an output, for receiving and storing a previous data byte from the digital subscriber line. A first multiplexer has first and second data inputs coupled to the outputs of the first and second latches, respectively. The first multiplexer also has a data output and a control input for selectively coupling the data at the first or second data input to the data output. The interface circuit further comprises a zero byte detector having an input coupled to the first latch for detecting a current data byte which is an all-zero byte, and an output coupled to the control input of the first multiplexer. The zero byte detector causes the first multiplexer to couple the current data byte stored in the first latch to the data output when the current data byte is not an all-zero byte, and to couple the previous data byte stored in the second latch to the data output when the current data byte is an all-zero data byte.

In accordance with another aspect of the present invention, an interface circuit for coupling a digital subscriber line to a digital transmission facility comprises a first latch having an input and an output, for receiving and storing a current data byte from the digital transmission facility, and a second latch also having an input and an output, for receiving and storing a previous data byte from the digital transmission facility. The interface circuit also comprises a first comparator having first and second inputs coupled to the outputs of the first and second latches, respectively, and an output. The interface circuit further comprises a control circuit having a first input coupled to the output of the comparator, a second input coupled to the output of the first latch, and a first output. The interface circuit also comprises a control circuit having a first input coupled to the output of the comparator, a second input coupled to the output of the first latch, and an output. The control circuit is responsive to an output from the first comparator indicating that the current and previous data bytes are different by passing the current data byte to the output of the control circuit, and is responsive to an output from the comparator indicating that the current and previous data bytes are identical by replacing the current data byte with an all-zero data byte at the output of the control circuit.

The present invention is also directed to a method for coupling a digital subscriber line to a digital transmission facility. The method comprises the steps of receiving a current data byte from the digital subscriber line; detecting whether the current data byte is an all-zero data byte; when the current data byte is not an all-zero byte, coupling the current data byte to the digital transmission facility; when the current data byte is an all-zero byte, replacing the current data byte with the previous byte received from the digital subscriber line and coupling the previous data byte to the digital transmission facility; and producing a control bit indicating whether the current data byte has been replaced with the previous data byte and coupling the control bit to the digital transmission facility.

In practical implementations of the present invention, the transmit and receive end portions of an ISDN interface circuit will typically be combined on a single ISDN channel unit or line card designed for plug-in installation in a remote digital terminal (RDT) or central office terminal (COT). However, it is within the scope of the invention to employ the transmit and receive portions of the ISDN interface circuit separately, or to employ the zero-byte substitution implementation in applications other than ISDN.

BRIEF DESCRIPTION OF THE DRAWINGS

Referring now to the drawings, which form a part of the original disclosure.

DETAILED DESCRIPTION OF THE PREFERRED EMBODIMENTS

Figure 1:
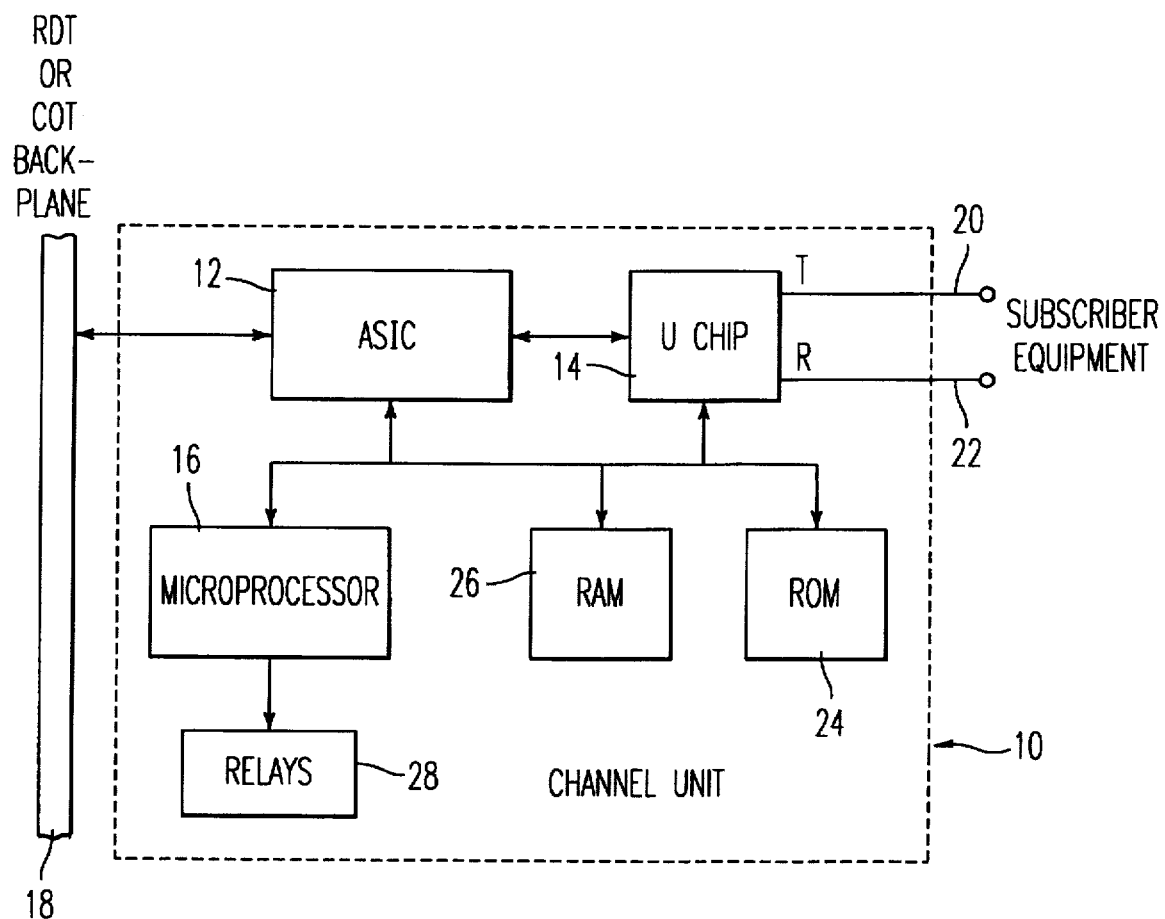
FIG. 1 is a block diagram of an ISDN channel unit or line card which incorporates the novel interface circuitry of the present invention.

An ISDN BRI channel unit or line card 10 employing the novel interface circuitry and zero-byte substitution implementation of the present invention is illustrated in FIG. 1. The purpose of the channel unit 10, which is preferably provided in the form of a plug-in card that can be installed in a remote digital terminal (RDT) or central office terminal (COT), is to provide a connection between a T1 digital communication facility and a subscriber or customer who requires ISDN service. The principal components of the channel unit 10 include an application-specific interface circuit (ASIC) 12, a U-interface chip (U chip) 14, and a microprocessor 16. The ASIC 12 provides an interface with the RDT or COT backplane 18, in order to send and receive time-slotted data at 4 MHz to and from the common equipment of the terminal in response to clocking and addressing signals (not shown) provided by the backplane. Among other functions, the ASIC 12 carries out both the transmit and receive-end functions of the zero-byte substitution process to be described shortly. Subscriber data passes in both directions between the ASIC 12 and the U chip 14. The U chip provides a standard 2B+D basic rate interface to the subscriber over tip and ring conductors 20 and 22. The U chip 14 is a commercially available component, and may comprise a Motorola MC145572 ISDN U-interface transceiver. Although the illustrated channel unit 10 has only a single pair of tip and ring conductors 20 and 22 for connection to a single subscriber, dual and quad embodiments are possible in which the channel unit 10 provides connections to two or four subscribers, respectively.

The operation of the ASIC 12 and U chip 14 is controlled by the microprocessor 16 in accordance with program code stored in a read-only memory (ROM) 24. A random access memory (RAM) 26 is also connected to the microprocessor 16 to provide storage for ASIC setup information, performance monitoring data, and the like. In addition to controlling the ASIC 12 and U chip 14, the microprocessor 16 also operates one or more on-board relays 28 which control certain functions of the channel unit 12. For example, one such relay may be used to configure the channel unit 12 for operation in either an RDT or a COT. A suitable microprocessor 16 for use in the channel unit 10 is the Model DS80C320 high-speed microcontroller manufactured by Dallas Semiconductor Corporation of Dallas, Tex.

Figure 2:
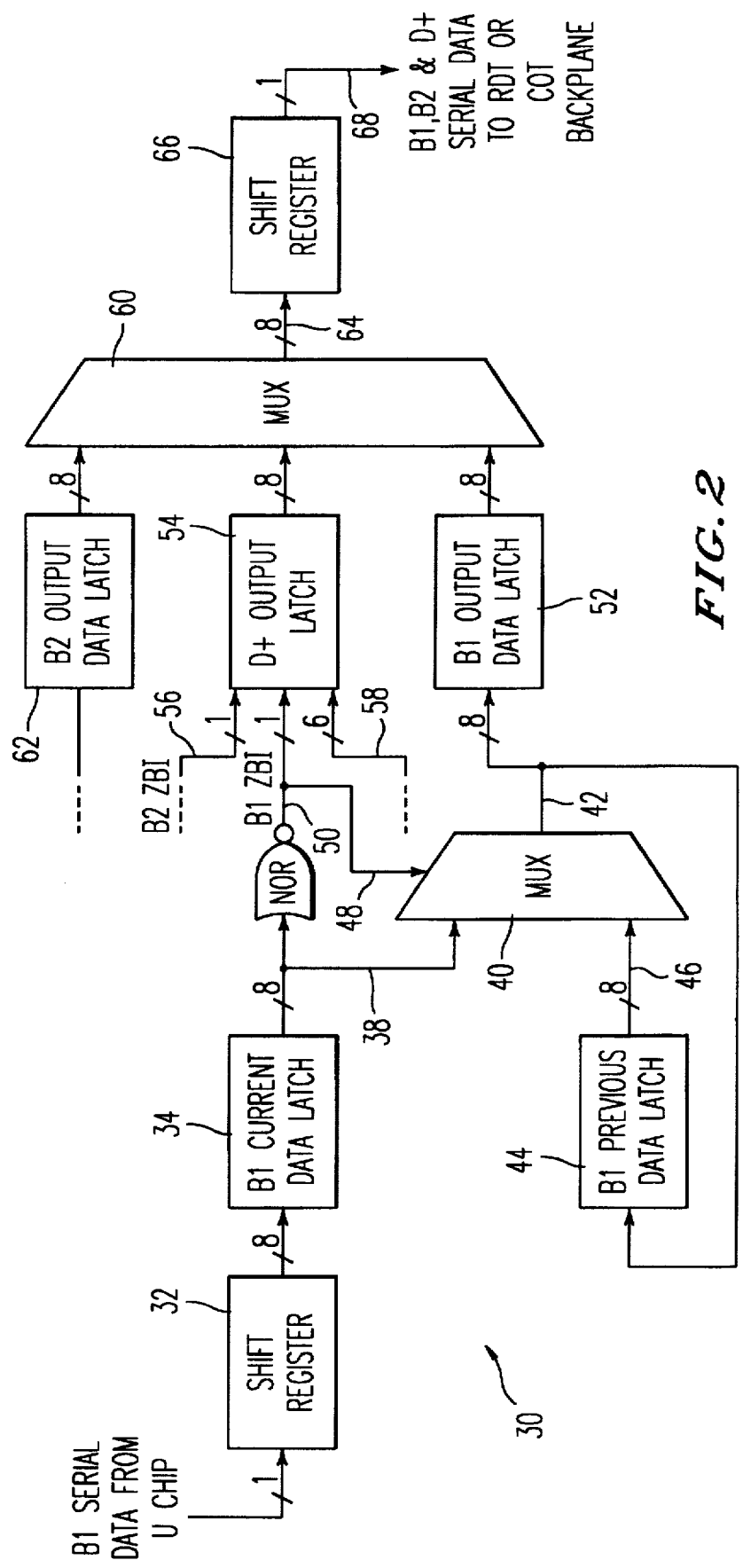
FIG. 2 is a block diagram of a transmit-end interface circuit which implements zero-byte substitution in accordance with a preferred embodiment of the present invention.

FIG. 2 is a block diagram illustrating the transmit portion 30 of an ISDN interface circuit constructed in accordance with a preferred embodiment of the present invention. It will be understood that the components shown in FIG. 2 are all provided as logic devices in the ASIC 12 of FIG. 1, and are operated in response to timing and control signals (not shown) received from the backplane 18. It will also be understood that FIG. 2 illustrates only one B-channel portion of the transmit-end circuit, and that most of the components illustrated will be duplicated for the second B channel. The interface circuit 30 includes an 8-bit shift register 32 which receives serial data corresponding to one of the two B channels (referred to hereinafter as the B1 channel) from the U chip 14 and provides this data in parallel at its output. The parallel output of the shift register 32 is connected to the input of a latch 34, which stores the current B1 data byte received from the subscriber through the U chip 14. The output of the latch 34 is connected to the input 38 of an 8-bit NOR gate 36 and to one input of an 8-bit, 2-to-1 multiplexer 40. The output 42 of the multiplexer is connected to the input of a second 8-bit latch 44 which stores a previous data byte received from the subscriber B2 channel. The output of the latch 44 is connected to the second input 46 of the multiplexer 42. The control input 48 of the multiplexer 40, which selectively couples either the first input 38 or the second input 46 to the multiplexer output 42, is connected to the output of the 8-bit NOR gate 36. The 8-bit NOR gate 36 serves as a zero byte detector for detecting whether the B1 data byte stored in the latch 34 has logical zeroes in all eight bit positions, and its output 50 corresponds to the ZBI flag for the B1 data channel. The B1 ZBI flag on line 50 has a digital 1 value when the B1 data byte in the latch 34 is an all-zero data byte, and has a digital 0 value when the B1 data byte stored in the latch 34 includes a logical 1 in any of its eight bit positions.

With continued reference to FIG. 2, the output 42 of the multiplexer 40 is connected to an 8-bit latch 52 which stores the output B1 data byte from the interface circuit 30. A further 8-bit latch 54 has one bit position input connected to the output 50 of the NOR gate 36 for receiving and storing the B1 ZBI flag, and a second bit position input 56 connected to the output of a similar NOR gate (not shown) in the B2 channel portion of the circuit 30 that produces the B2 ZBI flag. The remaining six bit position inputs 58 of the latch 54 receive inputs from other circuit components (also not shown) in order to provide the remaining bits of the 8-bit D+ channel As disclosed in the aforementioned U.S. Pat. No. 4,799,217, these additional bit positions include a yellow alarm bit position, a ones density bit position (set to a logical 1 value), two signalling bit positions (corresponding to the 2 bits of the subscriber D channel), a maintenance channel bit position and a maintenance framing bit position. These additional bit positions are not related to the present invention and their functions need not be described in detail. The 8-bit parallel output of the latch 54 is applied to one input of a 3-to-1, 8-bit multiplexer 60, and the 8-bit parallel output of the latch 52 is applied to a second input of the multiplexer 60. The third input of the multiplexer 60 is connected to the output of a further 8-bit latch 62 which stores the output data byte for the B2 data channel. In response to a control input (not shown) from the backplane 18 of FIG. 1, the multiplexer 60 sequentially selects the data from the latches 52, 54 and 62 to appear at the multiplexer output 64. The output line 64 is connected to the input of a shift register 66, which also operates under control of the backplane 18 of FIG. 1. The shift register 66 assembles the 8-bit B1, B2 and D+ bytes that are sequentially received in parallel from the multiplexer 60 into three successive 8-bit serial bytes on the shift register output line 68. In this way, the required three-time-slot format of the B1, B2 and D+ bytes is obtained for transmission to the backplane of the RDT or COT.

Figure 3:
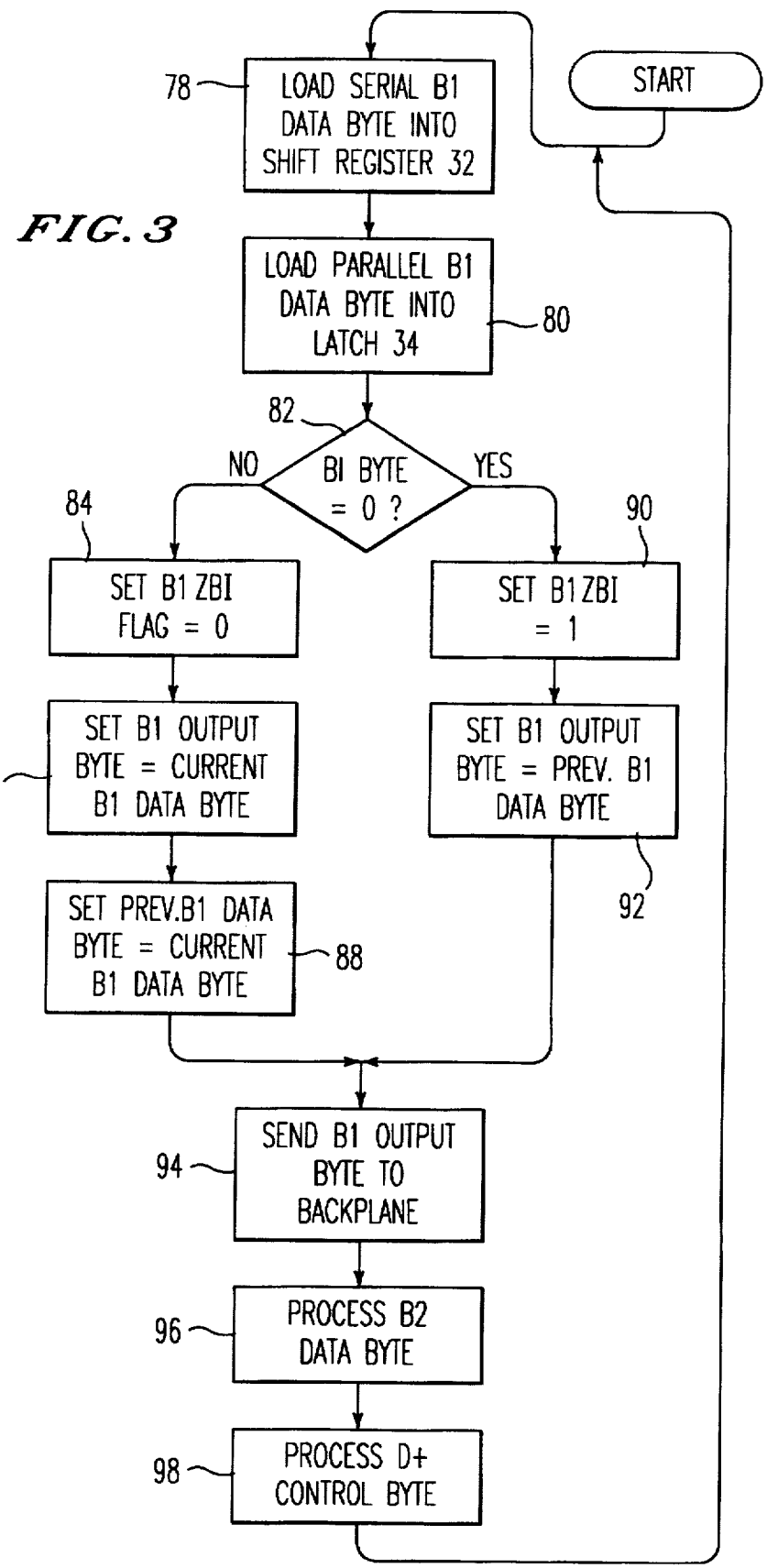
FIG. 3 is a flow chart which illustrates the sequence of operations carried out by the transmit-end circuit of FIG. 2.

FIG. 3 is a flow chart which summarizes the sequence of operations carried out by the transmit interface circuit 30 of FIG. 2 under the control of the backplane 18 of FIG. 1. In block 78, a B1 data byte from the U chip 14 is clocked into the shift register 72 and converted from serial to parallel form. In block 80, the parallel B1 data byte at the output of the shift register 32 is loaded into the B1 current data latch 34. In decision block 82, the current B1 data byte stored in the latch 34 is interrogated to determine whether it is an all-zero data byte by enabling the 8-bit NOR gate 36. If this inquiry produces a negative result, the output of the NOR gate 36 is low and the B1 ZBI flag is set to a logical 0 value as indicated in block 84. This value is then stored at the appropriate bit position in the D+ output latch 54. The low logic level at the output 50 of the NOR gate 36 is also applied to the control input 48 of the multiplexer 40, causing the multiplexer 40 to couple the first input 38 to the output 42. As a result, the current B1 data byte stored in the latch 34 is transferred to the B1 output data latch 52, as indicated in block 86. In addition, since the output 42 of the multiplexer 40 is connected to the input of the latch 44, the previous B1 data byte stored in the latch 44 is replaced with the current B1 data byte stored in the latch 34. This is indicated in block 88.

Referring again to decision block 82, and assuming now that the current B1 data byte stored in the latch 34 was found to be an all-zero byte by the NOR gate 36, processing proceeds to block 90. In block 90, the B1 ZBI flag is set to logic level 1 by the NOR gate 36, and this value is loaded into the appropriate bit position of the D+ output latch 54. At the same time, the logical 1 value that is applied to the control input of the multiplexer 40 causes the second input 46 of the multiplexer to be coupled to the multiplexer output 42. This causes the previous B1 data byte stored in the latch 44 to be transferred to the B1 output latch 52, in lieu of the current B1 data byte stored in the latch 34. This operation is indicated in block 92. Since the B1 data byte stored in the latch 34 is known to consist of an all-zero data byte, this value is not used to update the previous B1 data byte value stored in the latch 44. This insures that a non-zero data byte will always be stored in the latch 44 for use as a substitute or replacement byte.

With continued reference to FIG. 3, the negative and affirmative branches of the decision block 82 both ultimately lead to block 94, in which the B1 output byte stored in the latch 52 (consisting either of the current data byte or a repeat of the previous non-zero data byte) is sent to the backplane of the RDT or COT in which the channel unit 10 is installed. This is accomplished by controlling the multiplexer 60 of FIG. 2 to couple the output of the latch 52 to the input of the shift register 66, and clocking the bits of the B1 output data byte to the output line 68 of the shift register 66. When this is complete, the series of operations represented in block 78–94 is repeated for the B2 serial data received from the U chip 14, as indicated in block 96. This results in the current B2 channel data byte (or, if that byte is an all-zero byte, the previous non-zero B2 channel data byte) being stored in the latch 62 and then sent to the RDT or COT backplane by the multiplexer 60 and shift register 66. During B2 channel processing, the B2 ZBI generated by the interface circuit 30 is applied to the appropriate bit position of the latch 54. Subsequently, appropriate control bits (including the two D-channel control bits received from the subscriber) are applied to the remaining bit positions 58 of the latch 54 to provide the complete 8-bit D+ control byte. This is indicated in block 98. The D+ control byte is then sent to the RDT or COT backplane by the multiplexer 60 and shift register 66.

Figure 4:
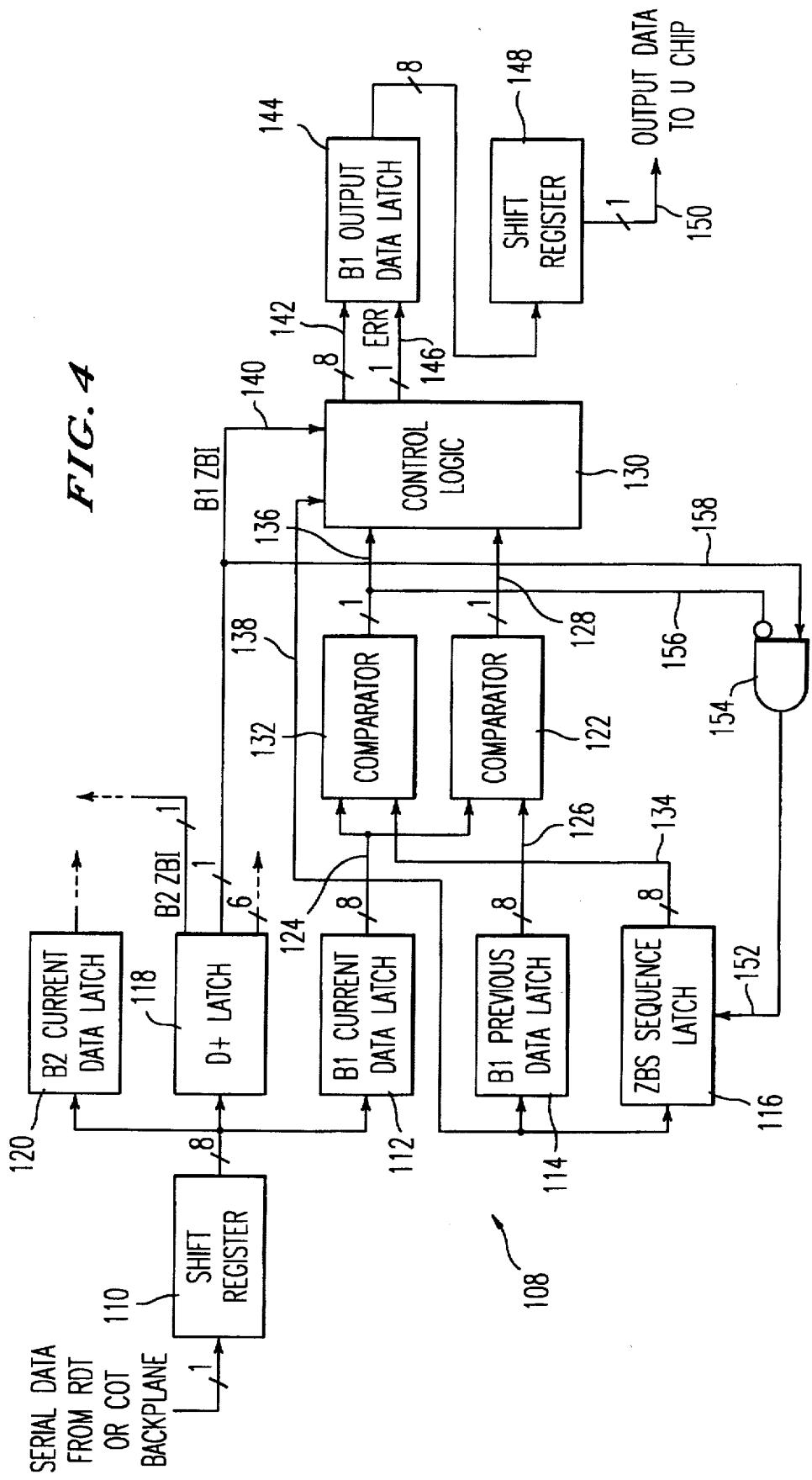
FIG. 4 is a block diagram of a receive-end interface circuit in accordance with a preferred embodiment of the present invention.

FIG. 4 is a block diagram of the receive portion 108 of the ISDN interface circuit, in which all-zero bytes that have been removed from the B1 and B2 channels at the transmit end are replaced in order to restore the data to its original form. As in the case of FIG. 2, it will be understood that most of the components required for processing the B2 data channel have been omitted for clarity, but will essentially duplicate those used for the B1 data channel. Also omitted are the components required for processing the various bits of the D+ control byte, other than the B1 ZBI flag. The circuit of FIG. 4, like that of FIG. 2, is implemented within the ASIC 12 of FIG. 1 and is operated under the control of the backplane 18.

With specific reference now to FIG. 4, the receive end circuit 108 includes an 8-bit shift register 110 which has its input coupled to the RDT or COT backplane in order to receive the serial B1, B2 and D+ channels from the T1 communication network. The parallel output of the shift register 110 is connected to the input of a first latch 112 which stores the current B1 data byte received from the backplane. The output of the latch 112 is, in turn, connected to the input of a second latch 114 which stores the previous non-zero B1 data byte received from the backplane. A third latch 116 also has its input connected to the output of the latch 112, and serves as a storage unit for a known replacement byte or ZBS sequence that is to be compared against each incoming B1 data byte to determine whether a zero-byte substitution has been made.

The parallel output of the shift register 110, in addition to being connected to the input of the latch 112, is connected in parallel to the inputs of two additional latches 118 and 120. The latch 118 is used to store the D+control channel byte that is received from the RDT or COT backplane, and the latch 120 is used to store the current B2 data byte that is received from the backplane. It will be understood that the backplane 18 of FIG. 1 applies suitable time-spaced control inputs to the latches 112, 118 and 120, so that each latch receives the proper byte from the shift register 110. It will also be understood that the latch 120 is part of a separate portion of the circuit 108 (not shown) that processes the B2 channel data bytes received from the RDT or COT backplane. The latch 118 may, if desired, be shared between the B1 and B2 channel portions of the circuit 108.

With continued reference to FIG. 4, a first comparator 122 is provided for comparing the current B1 data byte to the previous non-zero B1 data byte, as a means for determining whether a zero-byte substitution has occurred at the transmit end. This is accomplished by connecting the output 124 of the latch 112 to the first input of the comparator 122, and by connecting the output 126 of the latch 114 to the second input of comparator 122. The output 128 of the comparator 122, which will have a value of either logical 1 or logical 0 depending upon the outcome of the comparison, is coupled to a first input of a control logic circuit 130. In a similar manner, a second comparator 132 is provided for comparing the current B1 data byte to the known ZBS sequence stored in the latch 116, as a means for determining whether a zero-byte substitution has been made by the transmit circuitry of a channel unit whose interface circuitry replaces all-zero data bytes with fixed or known replacement bytes. This is accomplished by connecting the output 124 of the latch 112 to the first input of the comparator 132, and by connecting the output 134 of the latch 116 to the second input of the comparator 132. The output 136 of the comparator 132, which will have either a logical 1 or logical 0 value depending upon the outcome of the comparison, is connected to a second input of the control logic circuit 130. The control logic circuit 130 also has an 8-bit data input 138 connected to the output of the latch 112, and a further input 140 which receives the single-bit B1 channel ZBI flag from the D+ control byte latch 118. The control logic circuit 130 has an 8-bit data output 142 which is connected to the input of an 8-bit latch 144, and a single-bit error output 146 which is also connected to the latch 144. The latch 144 serves as an output latch for the B1 data byte that is to be transferred to the U chip 14 from the ASIC 12 of FIG. 1. An 8-bit shift register 148 has its input connected to the output of the latch 144, and the output 150 of the shift register is coupled to the U chip 14 of FIG. 1. The 8-bit shift register 148 is clocked by the backplane 18 of FIG. 1 to convert the parallel data at the output of the latch 144 to serial data for the U chip 14. If desired, an 8-bit, 3-to-1 multiplexer (not shown) may be added to the circuit 108 to allow the shift register 148 to provide the B1 and B2 channel data bytes, and the two D-channel control bits, to the U chip 14; alternatively, separate shift registers can be provided for the B2 data byte and the D channel bits.

Since it is conceivable that the fixed or known ZBS sequence used by the transmitting equipment may change, provision is made for updating the contents of the latch 116 when this situation occurs. This is accomplished by coupling the control input 152 of the latch 116 to the output of an AND gate 154. The AND gate 154 has two inputs 156 and 158. The input 156 is an inverting input and is coupled to the output 136 of the comparator 132. The input 158 is a non-inverting input and receives the B1 ZBI flag from the D+ latch 118. If the current B1 data byte stored in the latch 112 does not match the ZBS sequence stored in the latch 116, the output 136 of the comparator 132 will be at a low logic level and hence the inverting input 156 of the AND gate 154 will be at a high logic level. If the B1 ZBI flag from the D+ control channel is simultaneously at a high logic level, indicating that a zero-byte substitution has been made at the transmit end, the AND gate 154 will be enabled and the control input 152 of the latch 116 will be at a high logic level. This, in turn, will cause the contents of the latch 112 to be loaded into the latch 116, thereby replacing the previously stored ZBS sequence with the current B1 data byte. The current B1 data byte is assumed to be the replacement byte that is being substituted for an all-zero byte at the transmit end, and remains stored in the latch 116 so that it can be compared with future B1 data bytes by the comparator 132.

Figure 5:
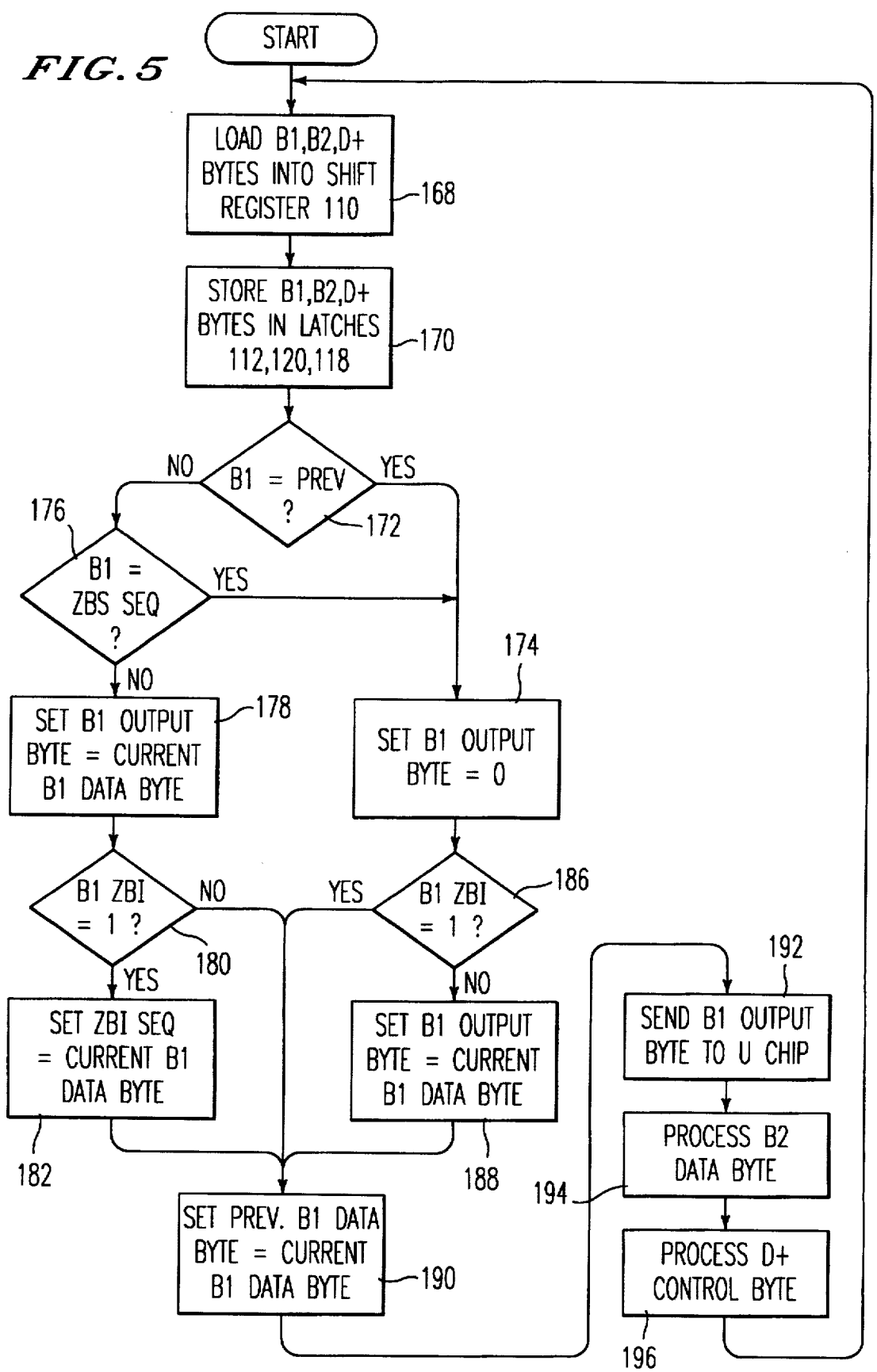
FIG. 5 is a flow chart which describes the sequence of operations carried out by the receive-end interface circuit of FIG. 4.

FIG. 5 is a flow chart which illustrates the sequence of operations carried by the receive circuit 108 of FIG. 4 under the control of the backplane 18 of FIG. 1. In block 168, the B1, B2 and D+ bytes received from the RDT or COT backplane are clocked into the shift register 110. In block 170, the B1, B2 and D+ bytes are transferred from the shift register 110 to the respective latches 112, 120 and 118. In decision block 172, a determination is made by the comparator 122 as to whether the current B1 data byte is identical to the previous non-zero B1 data byte stored in the latch 114. If so, a zero-byte substitution may have occurred at the transmit end, and the current B1 data byte is replaced by an all-zero data byte in block 174. In the block diagram of FIG. 4, this is accomplished by the control logic 130 producing an all-zero byte on the output 142 in response to a logical 1 on the input 128. The all-zero byte is then stored in the output latch 144. If the determination made in decision block 172 produces a negative result, processing proceeds to decision block 176 where a determination is made by comparator 132 as to whether the current B1 data byte stored in latch 112 is identical to the ZBS sequence stored in the latch 116. If so, a logical 1 signal is produced on the output of the comparator 132 and is applied as an input to the control logic circuit 130. As before, this causes the control logic circuit 130 to produce an all-zero byte at its output 142, and this byte is stored in the output latch 144. However, if this comparison produces a negative result, the control logic circuit 130 transfers the current B1 data byte stored in the latch 112 to the output latch 144, as indicated in block 178. It will be observed from FIG. 5 that this result occurs only after the current B1 data byte stored in the latch 112 fails to match either the previous data byte stored in the latch 114 or the ZBS sequence stored in the latch 116, a situation which the circuit 108 interprets as an indication that a zero-byte substitution has not occurred. Processing then proceeds to decision block 180, where the state of the B1 ZBI flag is checked and compared with the inverted output of the comparator 132 by the AND gate 154 to determine whether the ZBS sequence stored in the latch 116 needs to be updated. If so, the control input 152 of the latch 116 is enabled to load the current B1 data byte stored in the latch 112 into the ZBS sequence latch 116 for use in future comparisons. In cases where the ZBI flag is found to have a logical 1 value in decision block 180, erroneous data has been passed to the output 150 and a cyclic redundancy check (CRC) error is generated by the ASIC 12 and reported to the microprocessor 16 for performance monitoring purposes.

Assuming that an all-zero byte has been placed in the output latch 144 in block 174 as a result of a positive determination in decision block 172 or 176, processing proceeds to decision block 186. In decision block 186, the control logic circuit 130 checks the state of the B1 ZBI flag in the D+ latch 118. If the B1 ZBI flag has a logical 1 value, then the all-zero byte in the output latch 144 is correct and no further processing is needed. However, if the B1 ZBI flag has a logical 0 value, the control logic circuit 130 produces an error signal on the output line 146 to indicate that an error has occurred. At the same time, the control logic circuit 130 transfers the current B1 data byte from the latch 112 to the data output 142 of the control logic circuit. The error signal on line 146 is applied to the control input of the output latch 144, and causes the output latch 144 to load the current B1 data byte from the output 142 of the control logic circuit 130, which then replaces the all-zero byte loaded previously. As a result, the correct data is passed to the U chip 14 of FIG. 1 via the shift register 148 and output line 150.

After the output data has been transferred to the B1 output latch 144, a control signal is applied to the latch 114 to cause the previous B1 data byte stored in that latch to be updated or replaced by the current B1 data byte stored in the latch 112, as indicated in block 190. Since the current B1 data byte cannot consist of an all-zero data byte (as a result of the zero-byte substitution that has taken place at the transmit end), a non-zero value is always stored in the latch 114. The same is true of the value stored in the ZBS sequence latch 116. In block 192, the shift register 148 is clocked by the backplane 18 of FIG. 1 to transfer the output data from the latch 144 to the U chip 14. In block 194, the entire series of operations represented by previous blocks 172–192 is repeated for the B2 channel data byte. Finally, in block 196, the D+ control byte is processed and the 2 D-channel control bits are passed to the U chip 14. At this point, processing of the B1, B2 and D+ bytes is complete and a new set of bytes is loaded into the shift register 110 in block 168.

In the foregoing discussion, it has been assumed that the previous B1 or B2 data byte with which the current data byte is compared is the immediately preceding non-zero data byte. While this is the preferred arrangement, it is not strictly required. The comparison may instead utilize a previous data byte occurring earlier in time, provided that both the transmit and receive end equipment use the same previous data byte for replacement and comparison purposes. It is also within the scope of the invention to compare the current B1 or B2 data byte with more than one known ZBS sequence at the receive end, by employing a plurality of latches 116 and corresponding comparators 132 in the circuit 108 of FIG. 4. Furthermore, the loading of a new ZBS sequence by the latch 116 can, if desired, be constrained to occur only during an initial start-up or power-up interval, and not thereafter. This can be done, for example, by using a three-input AND gate in place of the two-input AND gate 154, and enabling the third input only during the initialization period.

Figure 6:
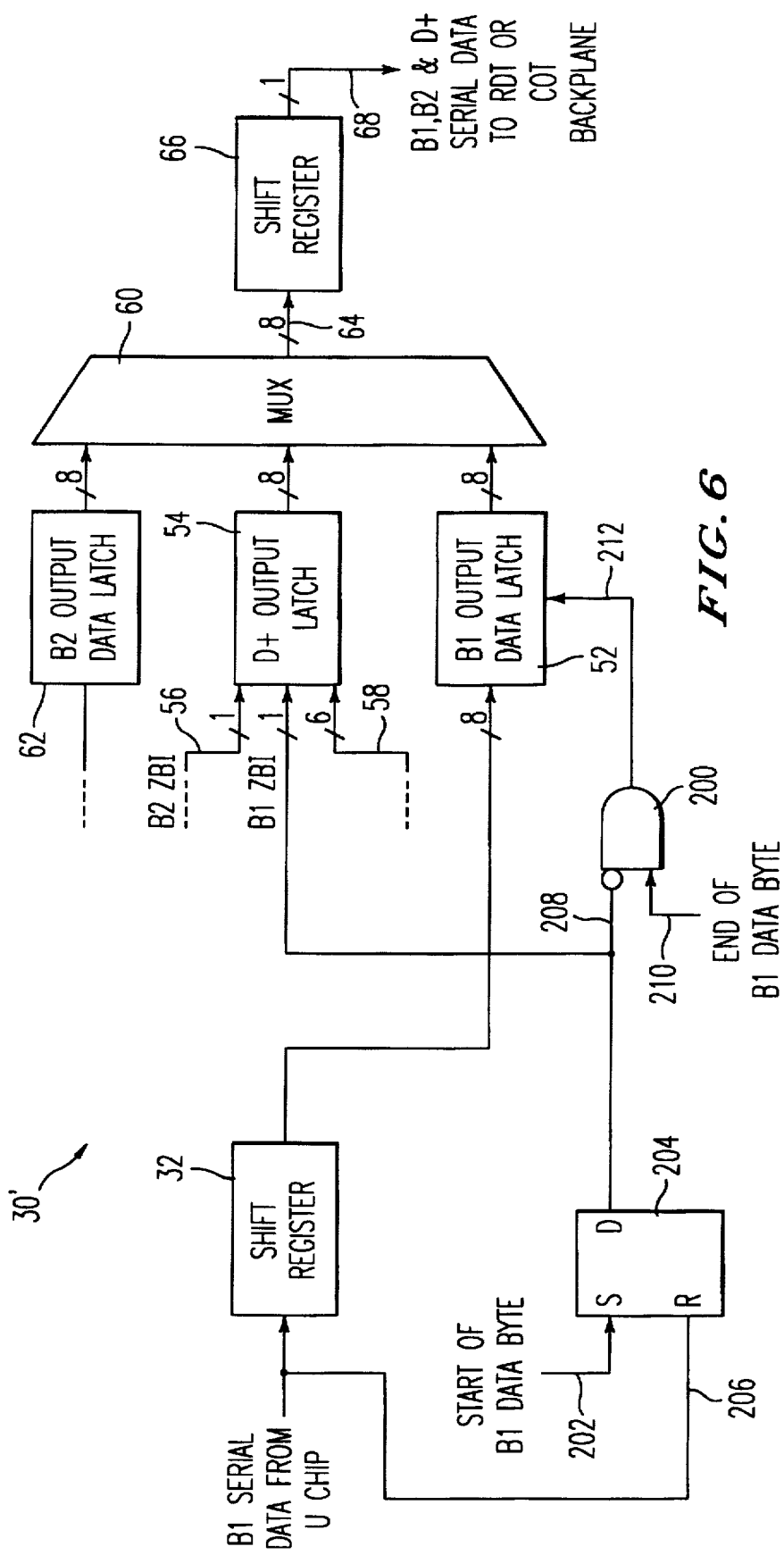
FIG. 6 is a block diagram of a modified version of the transmit-end interface circuit of FIG. 2.

FIG. 6 is a block diagram illustrating a modified version of the transmit-end interface circuit 30 of FIG. 2. In the modified circuit 30', the latches 34 and 44, multiplexer 40 and NOR gate 36 are omitted, and the detection of an all-zero byte is carried out directly on the incoming serial data. An AND gate 200 is used to suppress loading of the next B1 data byte into the output latch 52 when an all-zero byte is detected. The output latch 52 then continues to store the previous data byte sent out by the circuit 30'. When the first bit of a B1 channel serial data byte enters the shift register 32, a signal is produced on the SET input 202 of a flip-flop 204. The flip-flop 204 has its RESET input 206 connected to the input of the circuit 30' to receive the incoming serial data in parallel with the shift register 32. The data output 208 of the flip-flop 204 provides the B1 ZBI flag. If any bit of the incoming B1 data byte has a logical 1 value, the flip-flop 204 will be reset. Thus, the B1 ZBI flag will be produced (i.e., will have a logical 1 value) only if the B1 data byte is an all-zero byte. The AND gate 200 receives an inverted version of the B1 ZBI flag at its first input, and at its second input 210 receives a signal which is produced at the end of the current B1 data byte. The output 212 of the AND gate 200 is coupled to the control input of the B1 output data latch 52. Thus, at the end of the B1 byte, the AND gate 200 will load the data from the shift register 32 into the output latch 52 if, and only if, the data is non-zero and the B1 ZBI flag is zero. Otherwise, the output latch 52 continues to store the previously-sent B1 data byte, and the previous byte is repeated at the output 68 in lieu of the incoming all-zero B1 data byte. The signals on lines 202 and 210, representing the beginning and end, respectively, of the incoming B1 data byte, may be produced by conventional counters and logic circuitry based on signals received from the U chip 14 of FIG. 1.

Figure 7:
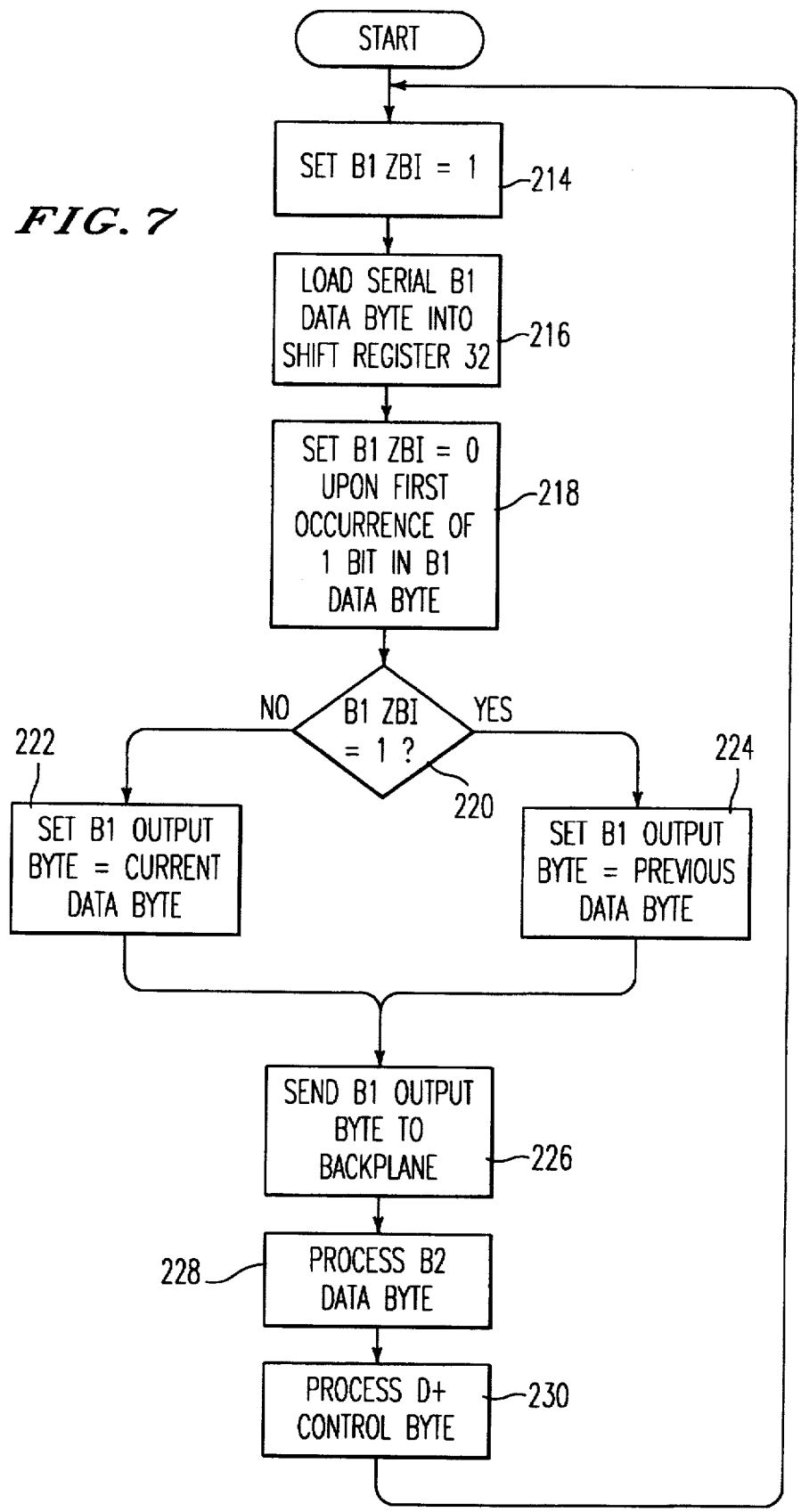
FIG. 7 is a flowchart which illustrates the sequence of operations carried out by the modified transmit-end circuit of FIG. 6.

FIG. 7 is a flow chart which describes the sequence of operations carried out by the modified transmit-end circuit 30' of FIG. 6. The functions described in blocks 214–224 correspond to those described above, and are carried out by the shift register 32, AND gate 200 and flip-flop 204. Blocks 226–230 correspond to blocks 94 86, respectively, of the flow chart shown in FIG. 3.

Figure 8:
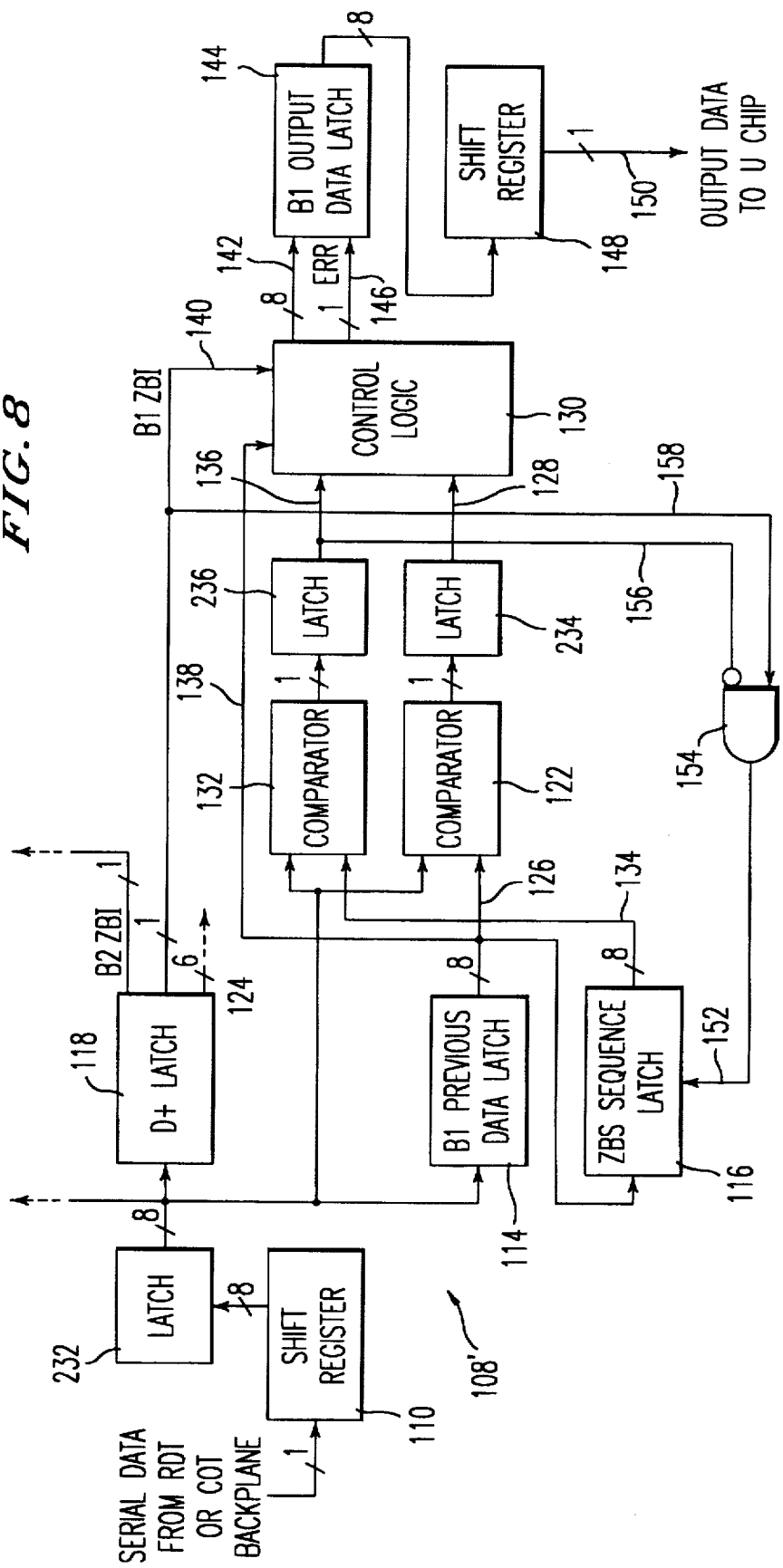
FIG. 8 is a schematic diagram of a modified version of the receive-end interface circuit shown in FIG. 4.

FIG. 8 is a block diagram of a modified version of the receive-end circuit 108 shown in FIG. 4. In the modified circuit 108', the B1 current data latch 112 is eliminated and an 8-bit latch 232 is added at the output of the shift register 110. The received B1 data byte stored in the latch 232 is compared with the previous B1 data byte stored in the latch 114 by means of the comparator 122, and is simultaneously compared with the stored ZBS sequence in the latch 116 using the comparator 132. The received B1 data byte is then stored in the latch 114 to become the previous B1 data byte for the next comparison operation. The single-bit outputs of the comparators 122 and 132 are stored in latches 234 and 236, respectively, before being applied as inputs to the control logic circuit 130. The comparators 122, 132 and ZBS sequence latch 116 may, if desired, be shared with the portion of the circuit 108' which processes the B2 data byte (not shown). Apart from the differences noted, the circuit 108' of FIG. 8 operates in substantially the same manner as the circuit 108 of FIG. 4.

Figure 9A:
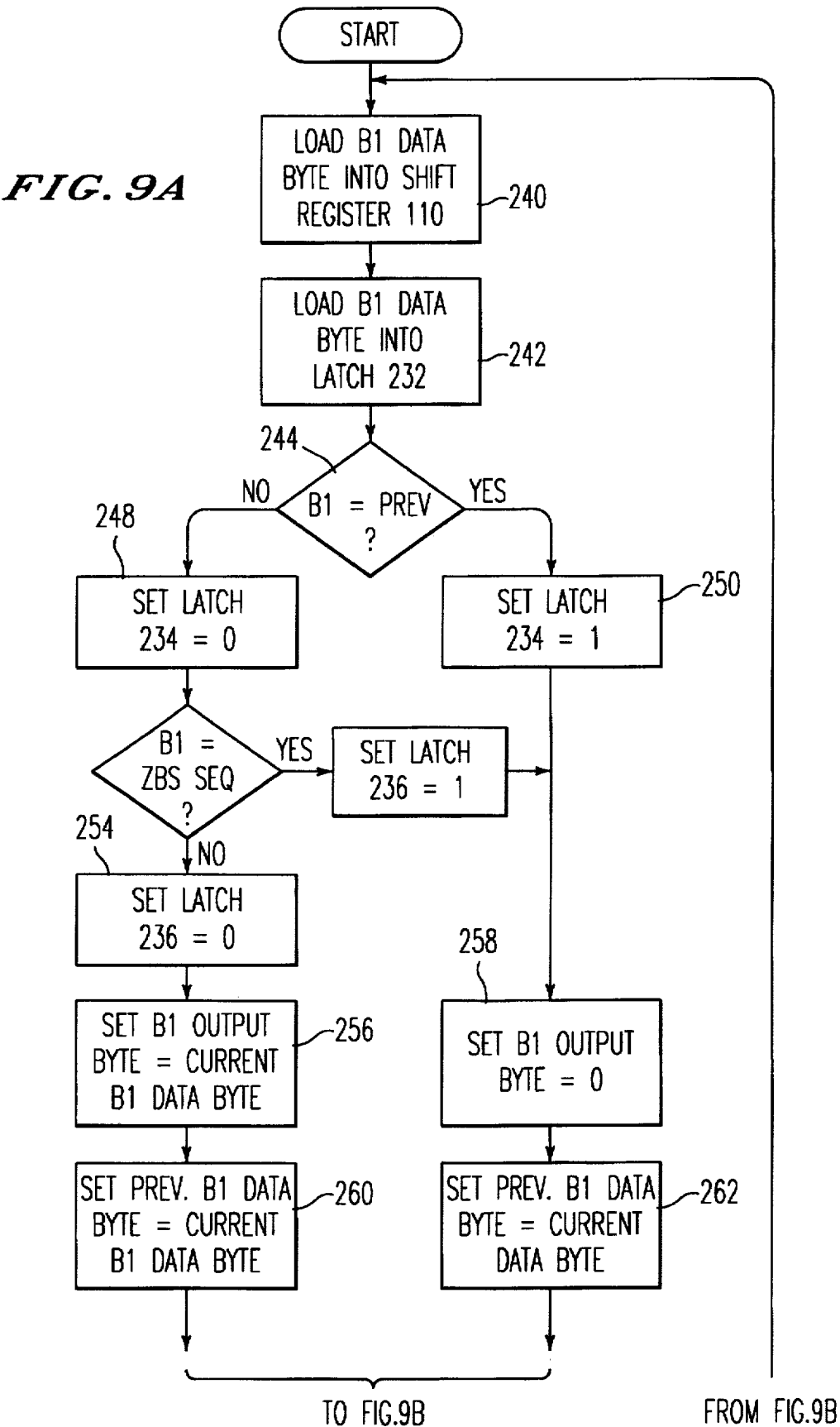
FIG. 9 is a flowchart which illustrates the sequence of operations carried out by the modified receive-end circuit of FIG. 8.
Figure 9B:
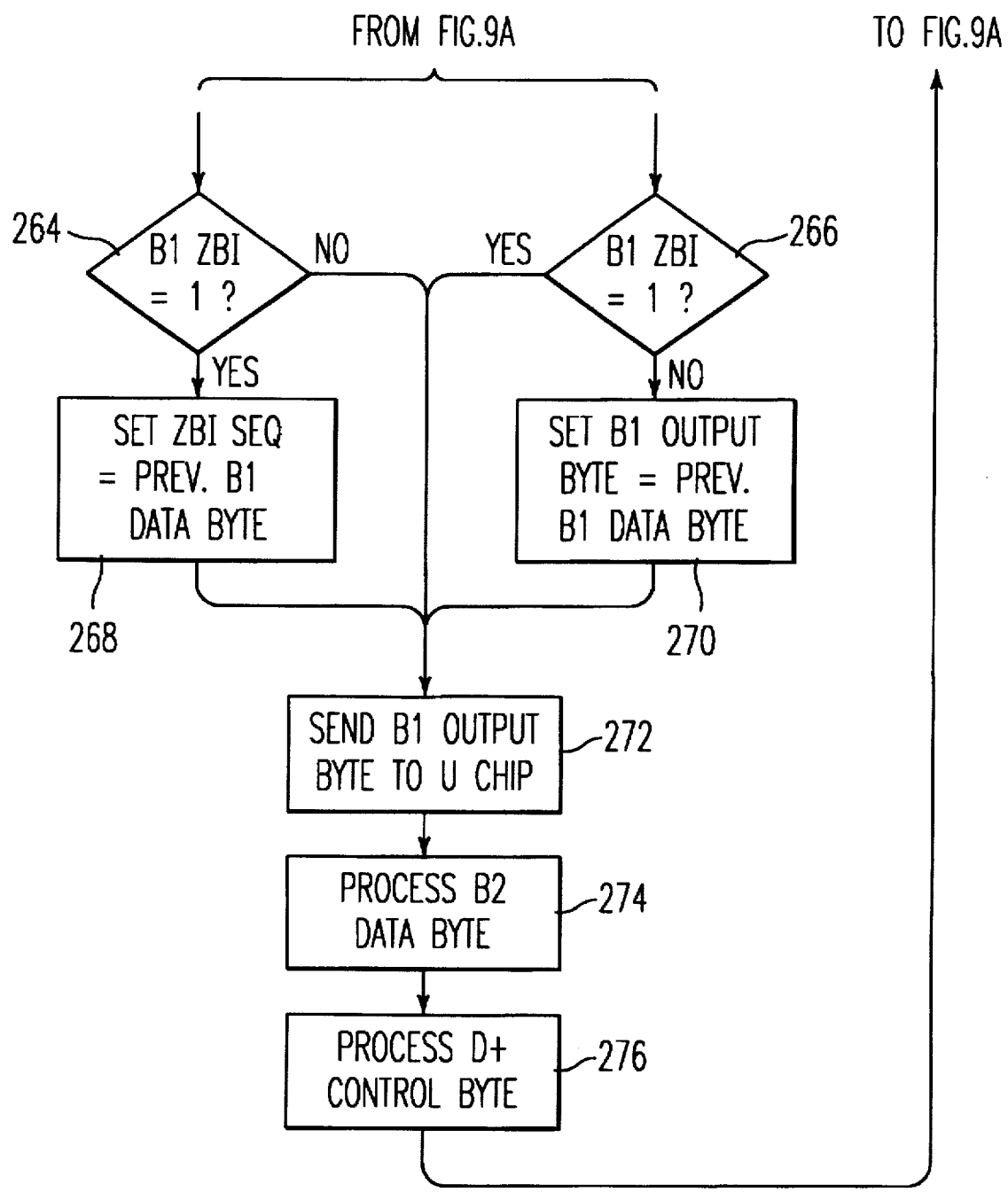

FIG. 9 is a flowchart which describes the sequence of operations carried out by the modified receive-end interface circuit 108' of FIG. 8. Following the loading and comparison steps in blocks 240–246, the latches 234 and 236 are set to 0 or 1 values in blocks 248–254. The output data is latched in blocks 256 and 258, and the B1 previous data latch 114 is updated in blocks 260 and 262. The steps carried out in the remaining blocks 264–276 are substantially the same as those carried out in blocks 180–196 of FIG. 5. However, it will be noted that the updating of the ZBI sequence latch 116 in block 268, and the correction of the B1 output byte in block 270, are carried out using the data in the B1 previous data latch 114 in the flowchart of FIG. 9.

While the present invention has been illustrated by means of certain exemplary embodiments thereof, it will be understood by those skilled in the art that various changes and modifications can be made therein. All such changes and modifications are intended to fall within the spirit and scope of the invention as defined in the appended claims.

What is claimed is:

1. An interface circuit for coupling a digital subscriber line to a digital transmission facility, comprising:

a first latch having an input and an output, for receiving and storing a current data byte from said digital subscriber line;

a second latch having an input and output, for receiving from said digital subscriber line a previous data byte which is not an all-zero data byte and for storing said previous data byte;

a first multiplexer having first and second data inputs coupled to the outputs of said first and second latches, respectively, a data output, and a control input for selectively coupling the data at said first or second data input to said data output;

a zero byte detector having an input coupled to the output of said first latch for detecting a current data byte which is an all-zero data byte, and an output coupled to the control input of said first multiplexer, said zero byte detector causing said first multiplexer to couple the current data byte stored in said first latch to said data output when said current data byte is not an all-zero data byte, and to couple the previous data byte stored in said second latch to said data output when said current data byte is an all-zero data byte.

2. An interface circuit as claimed in claim 1, wherein the data output of said first multiplexer is coupled to the input of said second latch.

3. An interface circuit as claimed in claim 1, further comprising:

a third latch having an input and an output, for receiving and storing a plurality of control bits;

wherein the output of said zero byte detector is coupled to the input of said third latch to provide at least one of said control bits.

4. An interface circuit as claimed in claim 3, further comprising:

a fourth latch having an input coupled to the data output of said first multiplexer and an output, for receiving and storing an output data byte; and a combiner coupled to the outputs of said third and fourth latches for combining said plurality of control bits and said output data byte for transmission over said digital transmission facility.

5. An interface circuit as claimed in claim 4, wherein said combiner comprises:

a second multiplexer having first and second data inputs coupled to the outputs of said third and fourth latches, respectively, and a data output, for selectively coupling the data at said first or second data input to said data output; and a shift register coupled to the data output of said second multiplexer for producing a combined serial output including said control bits and said output data byte.

6. An interface circuit as claimed in claim 1, wherein said zero byte detector comprises a NOR gate.

7. An interface circuit as claimed in claim 1, wherein the data output of said first multiplexer is coupled to the input of said second latch to update the previous data byte stored in said second latch with the current data byte stored in said first latch.

8. An interface circuit for coupling a digital subscriber line to a digital transmission facility, comprising:

a first latch having an input and an output, for receiving and storing a current data byte from said digital transmission facility;

a second latch having an input and an output, for receiving and storing a previous data byte from said digital transmission facility;

a first comparator having first and second inputs coupled to the outputs of said first and second latches, respectively, and an output; and a control circuit having a first input coupled to the output of said comparator, a second input coupled to the output of said first latch, and a data output, said control circuit being responsive to an output from said first comparator indicating that said current and previous data bytes are different by passing said current data byte to said data output, and being responsive to an output from said comparator indicating that said current and previous data bytes are identical by producing an all-zero data byte at said data output.

9. An interface circuit as claimed in claim 8, wherein said control circuit further comprises a third input for receiving a control bit from said digital transmission facility, said control bit indicating whether said current data byte was substituted for an all-zero data byte prior to transmission over said digital transmission facility, and wherein said control circuit is responsive to an output from said first comparator indicating that said current and previous data bytes are identical by checking the state of said control bit after producing said all-zero data byte at said data output, and by replacing said all-zero data byte with said current data byte if said control bit indicates that said current data byte was not substituted for an all-zero data byte prior to transmission over said digital transmission facility.

10. An interface circuit as claimed in claim 8, wherein the output of said first latch is coupled to the input of said second latch to update the previous data byte stored in said second latch.

11. An interface circuit is claimed in claim 8, further comprising:

a storage unit having an output, for storing a substitute data byte; and a second comparator having first and second inputs coupled to the outputs of said first latch and said storage unit, respectively, and an output;

wherein said control circuit further comprises a third input coupled to the output of said second comparator, said control circuit being responsive to an output from said second comparator indicating that said current and substitute data bytes are different by passing said current data byte to said data output, and being responsive to an output from said comparator indicating that said current and substitute data bytes are identical by producing an all-zero data byte at said data output.

12. An interface circuit as claimed in claim 11, wherein said control circuit further comprises a fourth input for receiving a control bit from said digital transmission facility, said control bit indicating whether said current data byte was substituted for an all-zero data byte prior to transmission over said digital transmission facility, and wherein said control circuit is responsive to an output from said first comparator indicating that said current and previous data bytes are identical, or to an output from said second comparator indicating that said current and substitute data bytes are identical, by checking the state of said control bit after producing said all-zero data byte at said data output and by replacing said all-zero data byte with said current data byte at said data output if said control bit indicates that said current data byte was not substituted for an all-zero data byte prior to transmission over said digital transmission facility.

13. An interface circuit as claimed in claim 12, wherein said storage unit comprises a third latch, said third latch having an input coupled to the output of said first latch for updating said substitute data byte with said current data byte.

14. An interface circuit as claimed in claim 13, wherein said third latch has a control input for causing said third latch to store a data byte applied to the input of said third latch, and further comprising an AND gate having an inverted input coupled to the output of said second comparator, a non-inverted input for receiving said control bit from said digital transmission facility, and an output coupled to the control input of said third latch, said AND gate output causing said third latch to store said current data byte as a new substitute data byte when the output of said second comparator indicates that said current and substitute data bytes are different and said control bit indicates that said current data byte was substituted for an all-zero data byte prior to transmission over said digital transmission facility.

15. An interface circuit as claimed in claim 9, further comprising a shift register having a serial input for receiving said current data byte and said control bit from said digital transmission facility, and a parallel output coupled to the input of said first latch and to said third input of said control circuit for applying said current data byte as an input to said first latch and said control bit as an input to said control circuit.

16. An interface circuit as claimed in claim 15, further comprising a third latch having an input coupled to said shift register and an output coupled to said third input of said control circuit.

17. A method for coupling a digital subscriber line to a digital transmission facility, comprising:

receiving a current data byte from said digital subscriber line;

detecting whether said current data byte is an all-zero data byte;

when said current data byte is not an all-zero data byte, coupling said current data byte to said digital transmission facility;

when said current data byte is an all-zero data byte, replacing said current data byte with a previous data byte received from said digital subscriber line that is not an all-zero data byte, and coupling said previous data byte to said digital transmission facility; and producing a control bit indicating whether said current data byte has been replaced with said previous data byte and coupling said control bit to said digital transmission facility.

18. A method as claimed in claim 17, further comprising:

receiving a current data byte from said digital transmission facility;

comparing the current data byte received from said digital transmission facility with a previous data byte received from said digital transmission facility;

when the current and previous data bytes received from said digital transmission facility are different, coupling the current data byte received from said digital transmission facility to said digital subscriber line; and when the current and previous data bytes received from said digital transmission facility are identical, replacing the current data byte received from said digital transmission facility with an all-zero data byte, checking the state of said control bit following said replacement, replacing said all-zero data byte with the current data byte received from said digital transmission facility if said control bit indicates that the current data byte received from said digital transmission facility was not substituted for an all-zero data byte prior to transmission over said digital transmission facility, and coupling the resulting all-zero byte or current data byte received from said digital transmission facility to said digital subscriber line.

19. A method as claimed in claim 18, further comprising:

comparing the current data byte received from said digital transmission facility with a stored substitute data byte;

when the current data byte received from said digital transmission facility and said substitute data byte are different, coupling the current data byte received from said digital transmission facility to said digital subscriber line; and when the current data byte received from said digital transmission facility and said substitute data byte are identical, replacing the current data byte received from said digital transmission facility with an all-zero data byte, checking the state of said control bit following said replacement, replacing said all-zero data byte with the current data byte received from said digital transmission facility if said control bit indicates that the current data byte received from said digital transmission facility was not substituted for an all-zero data byte prior to transmission over said digital transmission facility, and coupling the resulting all-zero byte or current data byte received from said digital transmission facility to said digital subscriber line.

20. A method as claimed in claim 19, further comprising:

when the current data byte received from said digital transmission facility and said substitute data byte are different, checking the state of said control bit; and replacing said stored substitute data byte with the current data byte received from said digital transmission facility if said control bit indicates that the current data byte received from said digital transmission facility was substituted for an all-zero data byte prior transmission over said digital transmission facility.

21. An interface circuit for coupling a digital subscriber line to a digital transmission facility, comprising:

a first shift register having an input and an output, for receiving and storing a current data byte from said digital subscriber line;

a first latch for receiving from said digital subscriber line a previous data byte which is not an all-zero data byte and for storing said previous data byte, said first latch having an input coupled to the output of said first shift register, an output, and a control input for controllably coupling data at the input of said first latch to the output thereof; and a zero byte detector having an input coupled to the input of said first shift register for detecting a current data byte which is an all-zero byte, and an output coupled to the control input of said first latch, said zero byte detector causing said first latch to load the current data byte from said first shift register and couple said current data byte to the output of said first latch when said current data byte is not an all-zero data byte, and to couple the previous data byte to the output of said first latch without loading the current data byte from said first shift register when said current data byte is an all-zero data byte.

22. An interface circuit as claimed in claim 21, further comprising:

a second latch having an input and an output, for receiving and storing a plurality of control bits;

wherein the output of said zero byte detector is coupled to the input of said second latch to provide at least one of said control bits.

23. An interface circuit as claimed in claim 22, further comprising a combiner coupled to the outputs of said first and second latches for combining said plurality of control bits and said output data byte for transmission over said digital transmission facility.

24. An interface circuit as claimed in claim 23, wherein said combiner comprises:

a multiplexer having first and second data inputs coupled to the outputs of said first and second latches, respectively, and a data output, for selectively coupling the data at said first or second data input to said data output; and a second shift register coupled to the data output of said multiplexer for producing a combined serial output including said control bits and said output data byte.

25. An interface circuit as claimed in claim 21, wherein said zero byte detector comprises:

a flip-flop having a set input, a reset input coupled to the input of said first shift register, and a data output; and an AND gate having first and second inputs and an output, said first input being an inverted input and being coupled to the data output of said flip-flop, and said output of said AND gate being coupled to the control input of said first latch.

26. An interface circuit for coupling a digital subscriber line to a digital transmission facility, comprising:

a first latch having an input and an output, for receiving and storing a current data byte from said digital transmission facility;

a second latch for receiving and storing a previous data byte from said digital transmission facility, said second latch having an input coupled to the output of said first latch and an output;

a first comparator having first and second inputs coupled to the outputs of said first and second latches, respectively, and an output; and a control circuit having a first input coupled to the output of said comparator, a second input coupled to the output of one of said first and second latches, and a data output, said control circuit being responsive to an output from said first comparator indicating that said current and previous data bytes are different by passing said current data byte to said data output, and being responsive to an output from said comparator indicating that said current and previous data bytes are identical by producing an all-zero data byte at said data output.

27. An interface circuit as claimed in claim 26, wherein said control circuit further comprises a third input for receiving a control bit from said digital transmission facility, said control bit indicating whether said current data byte was substituted for an all-zero data byte prior to transmission over said digital transmission facility, and wherein said control circuit is responsive to an output from said first comparator indicating that said current and previous data bytes are identical by checking the state of said control bit after producing said all-zero data byte at said data output, and by replacing said all-zero data byte with said current data byte if said control bit indicates that said current data byte was not substituted for an all-zero data byte prior to transmission over said digital transmission facility.

28. An interface circuit as claimed in claim 26, further comprising:

a storage unit having an output, for storing a substitute data byte; and a second comparator having first and second inputs coupled to the outputs of said first latch and said storage unit, respectively, and an output;

wherein said control circuit further comprises a third input coupled to the output of said second comparator, said control circuit being responsive to an output from said second comparator indicating that said current and substitute data bytes are different by passing said current data byte to said data output, and being responsive to an output from said comparator indicating that said current and substitute data bytes are identical by producing an all-zero data byte at said data output.

29. An interface circuit as claimed in claim 28, wherein said control circuit further comprises a fourth input for receiving a control bit from said digital transmission facility, said control bit indicating whether said current data byte was substituted for an all-zero data byte prior to transmission over said digital transmission facility, and wherein said control circuit is responsive to an output from said first comparator indicating that said current and previous data bytes are identical, or to an output from said second comparator indicating that said current and substitute data bytes are identical, by checking the state of said control bit after producing said all-zero data byte at said data output and by replacing said all-zero data byte with said current data byte at said data output if said control bit indicates that said current data byte was not substituted for an all-zero data byte prior to transmission over said digital transmission facility.

30. An interface circuit as claimed in claim 29, wherein said storage unit comprises a third latch, said third latch having an input coupled to the output of one of said first and second latches for updating said substitute data byte with said current data byte.

31. An interface circuit as claimed in claim 30, wherein said third latch has a control input for causing said third latch to store a data byte applied to the input of said third latch, and further comprising an AND gate having an inverted input coupled to the output of said second comparator, a non-inverted input for receiving said control bit from said digital transmission facility, and an output coupled to the control input of said third latch, said AND gate output causing said third latch to store said current data byte as a new substitute data byte when the output of said second comparator indicates that said current and substitute data bytes are different and said control bit indicates that said current data byte was substituted for an all-zero data byte prior to transmission over said digital transmission facility.

32. An interface circuit as chimed in claim 27, further comprising a shift register having a serial input for receiving said current data byte and said control bit from said digital transmission facility, and a parallel output coupled to the input of said first latch for applying said current data byte as an input to said first latch, the output of said first latch being coupled to said third input of said contact circuit for applying said control bit as an input to said control circuit.

33. An interface circuit as claimed in claim 32, further comprising a third latch having an input coupled to the output of said shift register and an output coupled to said third input of said control circuit.

* * * * *